Figure 1:
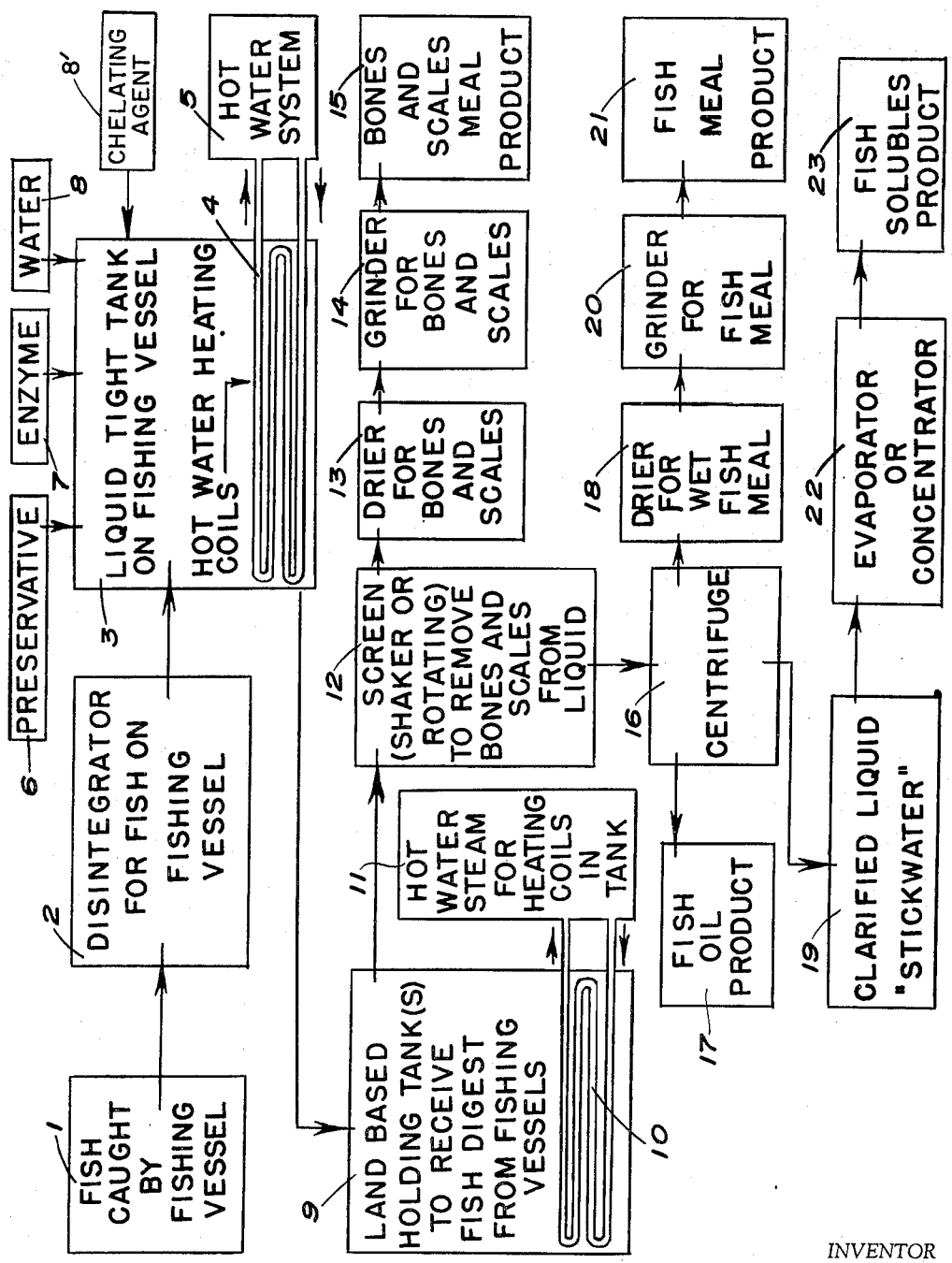

May 3, 1966    C. W. KEYES ETAL    3,249,442
METHODS OF PROCESSING FISH
Filed Dec. 4, 1962

INVENTOR
CLOIS W. KEYES
WILMON W. MEINKE
BY
ATTORNEY

United States Patent Office 3,249,442
Patented May 3, 1966

3,249,442
METHODS OF PROCESSING FISH
Clois W. Keyes, 6025 Reiger, Dallas, Tex., and Wilmon W. Meinke, 306 Crescent Drive, Bryan, Tex.
Filed Dec. 4, 1962, Ser. No. 246,646
6 Claims. (Cl. 99—18)

This application is a continuation-in-part of our copending application, Serial No. 860,283, filed December 17, 1959, now abandoned, and reference is made thereto.

This invention relates to new and useful improvements in methods of processing fish.

The invention relates broadly to improved methods for processing fish and more particularly to treatment and recovery methods for securing fish products on a mass production scale.

One of the objects of the invention is to provide improved methods for handling fish which are initiated in operation as the fish are caught by the fishing vessel so that the fish are immediately subjected to the treatment process while the fishing vessel is engaged in caching other fish or is en route to port for ensuring freshness of the treated products and obtaining high quality beneficial food products from the fish.

Another object of the invention is to provide improved methods of handling fish where the fish are subjected to treatment with enzymes and preservatives of various selection for ensuring a high quality of the products obtainable from the fish.

Still another object of the invention is to provide improved methods for treating fish for deriving therefrom animal food of high quality together with by-products useful in various industries.

An important object of the invention is to provide improved methods of processing fish utilizing chelating agents for preserving the efficacy of the preservative agents.

Other and further objects of the invention will be understood from the specification hereinafter.

A construction designed to carry out the invention will be hereinafter described, together with other features of the invention.

The invention will be more readily understood from a reading of the following specification and by reference to the accompanying drawing, wherein an example of the invention is shown, and wherein:

FIG. 1 is a flow diagram illustrating the methods of handling fish according to this invention and indicating the various fish products obtainable by use of the methods.

Referring to the flow diagram of FIG. 1, the methods of this invention follow immediately after the fish are caught aboard the fishing vessel as indicated by block 1 in FIG. 1. As the fish are caught they are fed to a disintegrator, chopper or grinder, indicated at 2 aboard the fishing vessel. The disintegrated fish are then fed into a liquid tight tank 3 aboard the fishing vessel which may, however, have an open top. Tank 3 may be fitted with heating or cooling coils 4 in the bottom of the tank. The heat for the hot water system to supply the coils 4 in tank 3 may be utilized either from the waste heat of the engine of the fishing vessel, or from an independent fuel-fired hot water heater 5. In many cases, no heat need be added, and alternatively, cooling provided by pumping sea water through the coils at sea water temperature may be utilized. The tank 3 is insulated to conserve heating or cooling and to prevent transfer of heat to or from other parts of the fishing vessel.

In most if not all instances, both heating or cooling of the various vessels and tanks may be eliminated completely, and the entire method, at least on the fishing vessel and possibly during further processing at a land installation, be carried out at ambient temperatures. Of course, temperatures below freezing may require some moderate heating simply to maintain the processing materials in a fluid state, and some heating may at times be desirable to accelerate the enzymatic process.

In general, the preservation and storage of fish material aboard the fishing boat and the transfer of digested fish to land-based holding tanks may be accomplished at ambient temperatures. Desirably, however, elevated temperatures are employed in the land-based tanks to aid in the separation of fish oil from the other components and to provide for cleaner separation of bones and scales from the liquid digest. Also, elevated temperatures are essential to the drying of the recovered fish solids and for concentrating the stickwater to fish solubles.

Additives introduced into the tank 3 are indicated as comprising the preservative 6, enzyme 7, and water 8, and as noted hereinafter, a chelating agent is added, as indicated at 8'. When the fishing vessel reaches port, the contents of the tank 3 on the vessel are pumped to land-based tanks represented at 9 for storage and further processing, it being noted that additional water for pumping purposes need not be added. These tanks 9 are equipped with hot water or low pressure steam coils 10 heated from the heater 11, which will permit the attainment and holding of a temperature of 70° to 80° C. for a period of thirty to sixty minutes. This heating is provided to inactivate enzyme activity and to permit easier removal of bones and scales from oil and liquid digest. The land-based tanks 9 serve as auxiliary tanks whereby settling of bones and scales to the bottom of the tank and a top layer of oil is realized. This operation permits decanting of the oil layer, within limitation, from the aqueous liquid layer. Also decantation of aqueous liquid layer from the bones and scales can be realized. By this process hot rinse water at approximately 70° C. can be added to the drained bones and scales and thus remove more of the liquid digest from the bones and scales when they are conveyed to the screen separator 12. When the process is carried out on a factory ship at sea, a series of tanks to receive the disintegrated fish are utilized both as receiving tanks and settling tanks. The capacity of the factory ship in handling a certain number of tons of fish determines the number of tanks to be employed. On a factory ship at sea the operation of the process is the same. The only change in the flow sheet is that the land-based holding tanks are located on the factory ship as discussed hereinafter. The separation is accomplished by a shaker or rotating screen 12 as indicated in FIG. 1. The bones and scales are dried as indicated at 13 and ground as indicated at 14 to produce a bones and scales meal product as indicated at 15.

The liquid separated from the bones and scales goes to a centrifuge 16 and a three-fold separation is realized, i.e., fish oil product 17; a wet fish meal 18; and a clarified liquid 19 known as "Stickwater" are produced. The wet fish meal, delivered from the centrifuge 16, is dried in the drier 18 and ground at 20 to produce a fish meal product 21. The clarified liquid 19 is concentrated by the removal of water at 22 by an evaporator or concentrator 22 to produce a fish solubles product 23. This final fish solubles product 23 is acidified to approximately pH 4.5.

The process as outlined yields four products:

(a) *Bones and scales meal.*—Protein—28.2%, moisture—8.0%, ash—54.6%, oil—4.6%.

(b) *Fish meal.*—Protein—60.7%, moisture—8.0%, ash—11.8%, oil—4.8%.

(c) *Fish solubles.*—Protein—32%, total solids—42–50%.

(d) *Fish oil.*—Assay values cited are representative of experimental samples prepared from mixed rough or trash fish of the shrimper's trawl.

The two meals (a) and (b) and the fish solubles (c) are designed for use in mixed feed formulations, specifically for poultry feed formulations. Fish oil finds use as a human food and as an industrial raw material either for direct use or further processing.

If the water added to the ground or chopped fish is in the form of distilled water and the fish are reasonably clean, it is not necessary to add a chelating agent although it may be desirable to do so. On a practical basis, however, the fish may well have some surface dirt thereon and will be wet with sea water. Further, the water used in the process will be ordinary tap water, or more likely, sea water, especially aboard the fishing vessel, both of which introduce metal ions, particularly alkaline earth metal ions and other polyvalent metal ions of chelation potential into the process. The effect of the presence of such ions is to chelate with the preservatives and thus impair the action of the latter.

For the foregoing reason it is essential to the process when water containing metal ions and particularly alkaline earth, heavy metal and other polyvalent ions is employed, to add a chelating agent which will form coordinates or complexes with the metal ions and so sequester them from the preservatives present as to prevent the formation of chelate complexes between the preservatives and the metal ions. Of course, the chelating agent or agents must be such as to exhibit a superior attraction to the metal ions over the preservatives, or even be capable of retrieving metal ions from complexes already formed with the preservative.

The process of the invention is the addition of a preservative or preservatives, along with a chelating agent, in conjunction with the carrying out of an enzymatic degradation or solution process on the flesh and viscera of the fish. The enzyme is supplied as added commercially available preparations or viscera or viscera preparations or concentrates resulting from other fish cleaning operations such as processes for preparation of fish for human consumption, which function additively with any enzymes native to the fish which are made available to digestion of the fish flesh and viscera by grinding or otherwise mechanically disintegrating the whole fresh fish. The process, addition of preservative, chelating agent and enzyme, is initiated on the fresh fish as they are taken from the fisherman's trawl or net. That is, the fresh fish are mechanically disintegrated and placed in a liquid tight tank aboard the fishing vessel. Water, preservative, a chelating agent and enzyme are added.

The function of the preservative is to prevent bacterial growth in the mass of ground fish. By preventing bacterial growth it is possible to control undesirable odor and undesirable loss in nutritive value of the fish components. An offensive odor, associated with fish which have been subjected to bacterial decomposition, carries through to the finished products. The odor thus is a problem in actual processing of the fish as well as in feeds formulated with the products derived from fish which have undergone bacterial decomposition.

The function of the enzyme is to produce a liquid digest of the viscera and flesh of the fish. For this action a proteolytic, protein splitting, enzyme is required. This is the prime consideration and not the source of the enzyme. As a source of enzyme or enzymes for the process, commercial preparations of animal, vegetable and bacterial origin, fresh fish viscera or offal from fish processing procedures, and whole ground fish (viscera and offal intact) all can supply enzyme activity capable of producing liquid digests of fish viscera and flesh, but quantities of enzyme in excess of that naturally present must be added.

As noted hereinbefore, the water added to the ground or chopped fish will almost invariably be ordinary tap water or sea water, both of which contain appreciable quantities of metal ions. Under these conditions a chelating agent is to be used.

Any molecule or ion with an unshared electron pair may coordinate or complex with a metal ion. Among the familiar inorganic compounds, in addition to ammonia, which coordinate readily, are: cyanide, thiocyanate and fluoride. Organic molecules may also form coordination compounds, and especially chelates, if they contain two or more groups such as: —OH, —SH, —COOH, —PO$_3$H$_2$, C=O, N, —S, —O—, in the proper geometrical relation to each other.

Polycarboxylic acids (oxalic, succinic), hydroxy acids (citric, tartaric, maleic, ascorbic); polyhydroxy compounds (starch, cellulose), acids (hexametaphosphate, pyrophosphate, phytic acid, adenosinetriphosphate); amino acids (glutamic acid, histidine, cystein, glycine, etc.), peptides, proteins; pteridines, flavinoids, porphyrins, ethylene diamine tetra-acetic acid (EDTA), diethylene triamine pentaacetic acid (DTPA) and hydroxyethyl ethylene diamine triacetic acid (HEEDTA) are some examples of different types of chelating agents.

As of November 30, 1959 (Chemical and Engineering News, Nov. 30, 1959, page 32) the United States Food and Drug Administration listing of safe sequestrants or chelating agents include: calcium acetate, calcium chloride, calcium citrate, calcium diacetate, calcium gluconate, calcium hexametaphosphate, calcium phytate, citric acid, dipotassium phosphate, disodium phosphate, monocalcium acid phosphate, monoisopropyl citrate, potassium citrate, sodium acid phosphate, sodium citrate, sodium diacetate, sodium gluconate, sodium hexametaphosphate, sodium metaphosphate, sodium phosphate (mono-, di-, tribasic-), sodium potassium tartrate, sodium pyrophosphate, sodium tartrate, sodium tetraphyrophosphate, sodium tripolyphosphate and tartaric acid. Although other compounds of the above list may be used, citric acid has been found quite suitable.

The mechanical disintegration or grinding is one of the steps in processing of the fish prior to being added to tanks aboard the ship. Also, whole fish may be added to the tank and then fed to a device or grinding mechanism capable of disintegrating the fish in the tank. Grinding or disintegrating is of a magnitude to produce particle (flesh) sizes of one inch in maximum dimension or smaller. Whole fish do not respond to the enzyme-preservative process in the same manner as realized with ground fish.

Benefits derived from the preservative-enzyme process are as follows:

(1) Fresh fish are not subjected to bacterial decomposition and therefore odor problems associated with production of feed products from the fish are decreased. Also, products produced have greater nutritional value and formulated feeds containing the fish products do not possess the undesirable odor associated with fish products produced from fish which have undergone bacterial action.

(2) Processing time is gained at sea. That is, fish viscera and fish flesh are being liquified by the enzymes while in the tanks aboard the fishing boat. Thus fishing boats which stay at sea from one to seven days can process fish as they are caught and arrive at land-based operations with a product in their tanks consisting essentially of digested fish liquid covering undigested bones and scales at the bottom of the tank.

(3) Unloading is simple and without loss of fish components. The digested liquid is mechanically pumped to land-based tanks without the aid of pumping water. In general, when whole fish are pumped from boat to land, large volumes of pumping water are used. Fish and water are pumped onto a dewatering screen to separate water from fish. Liquid squeezed from the fish in the hold of the boat is lost by this pumping procedure. This is eliminated by the preservative-enzyme process.

Successful operation of the process of this invention involves the following parameters:

(1) *Enzyme concentration.*—From 0.1 to 4 percent based on the weight of fish.

Another possible benefit may be significant if chelation is considered. Intact proteins are chelating agents; however, degradation products of protein, peptides and amino acids, are stronger chelating agents than intact proteins. Thus, the addition of enzyme, over and above that supplied by the fish, gives more rapid rise to chelating agents (resulting from enzymic action on the fish protein). This fact could augment the desirable results obtained by adding a chelating agent such as citric acid. Liquid digests prepared in the laboratory with added enzyme and antibiotics (Terramycin) retained their freshness for over three months even in a dilute un-acidified state.

Furthermore the more rapid digestion of fish realized with added enzyme may be beneficial in preservation by an osmoetic effect; that is, bacterial cells shrink in a hypertonic solution, swell in a hypotonic solution and remain essentially unchanged in an isotonic solution. This is true because the bacterial cell attempts to equalize the solute concentration within the cell and the medium surrounding the cell. If excess solute is present outside of the cell, water will pass from the cell to the medium and thereby cause the bacterial cell to shrink. The opposite is true when a bacterial cell is placed in a hypotonic solution, i.e., distilled water as an extreme. In distilled water the bacterial cell will take on water to try and dilute the solutes within the bacterial cell. Thus, the more rapidly solid protein is put into solution by the enzymes the more rapid will be the rise in osmotic strength of the solution around the bacterial cell. This would give rise to unfavorable growth conditions of the bacteria by causing the bacterial cell to tend to shrink. Preservation of meats by high levels of table salt and of fruits by high sugar content syrups are two examples of osmotic preservation.

(2) *Preservative concentration.*—For Soluble Terramycin (20% activity) quantities ranging from 10 to 400 p.p.m. bacterial activity provide adequate preservation for periods up to 12 days. For nf. 180 (11.1% furazolidone) quantities ranging from 18 to 720 p.p.m. bacterial activity provide the same degree of preservation for 12 days. Preferably, these concentrations run in the ranges of 25–100 p.p.m. and 50 to 200 p.p.m., respectively. For a mixture of the two, ⅓ quantities of each is desirable. Evidence presented for other preservatives shows a wide variation in quantity of preservative to be used. Other preservations which meet the criteria of preservation, economics and non-toxicity as feed additives would have to be proved as to quantities needed for the preservative-enzyme process. As used herein the quantities of preservative are designated as parts per million based on fish weight of the bacterial activity of the preservative. Thus, the use of 5 milligrams of Biostat (20% oxytetracycline activity) in 50 grams of fish is the use of 20 p.p.m. bacterial activity of the preservative.

(3) *Temperature limitations.*—Not to exceed 60° C. In some instances with enzymes possessing a high temperature tolerance the temperature may be as high as 70° C. Above 70° C. damage to feed products to be produced from the fish may result. In general, when a chelating agent is employed the process is carried out at ambient temperatures.

(4) *Water to be added to ground fish.*—For economic reasons not to exceed much over 20 percent of the weight of fish.

(5) *Grinding or mechanical disintegration.*—To produce fish particle size of 1 inch or less.

(6) *pH Limitations.*—In general from 6.5 to 7.5 not to exceed 8, for certain enzymes such as pepsin the pH could be lower (2 to 3).

(7) *Chelating agent.*—The chelating agent to be used must have a greater affinity for the cations of magnesium and calcium than the preservative to be used, the tetracyclines which include Aureomycin (chlorotetracycline) and Terramycin (oxytetracycline). That is, the chelating agent to be employed, citric acid for example, must be able to either chelate with the cations and not the antibiotics or the chelating agent must be sufficiently strong to remove the cations which have chelated the preservative. Citric acid as tested (Table 1) was effective in the preservation of the fish. The sodium and potassium salts of citric acid also should give the same results. Likewise, EDTA, DTPA, HEEDTA (see above for name to go with abbreviations) and similar compounds and the polyphosphates listed above should accomplish the same desirable result because they have a greater affinity for metal cations, under preservation conditions for the fish process, than do the tetracycline preservatives. Gluconic acid and the sodium and potassium salts of gluconic acid also should suffice.

In the work of A. Albert and C. W. Rees (Nature, vol. 177, page 433 (1956)), the log stability constant (Log K') of the magnesium ion and oxytetracycline is given as 3.8. Using the magnesium ion as a criterion we may say the chelating agent to be used in the fish processing procedure must have a log stability constant (Log K) greater than 3.8 if oxytetracycline is used as a preservative. In general we may say the chelating agent of use must have higher Log K values for the bivalent cations, chiefly, the cations of magnesium and calcium, than the Log K values of the preservative.

The Log K value limitations on the chelating agents would change with preservative used, probably in a downward direction because the tetracyclines are fairly strong chelating agents. The addition of a cheap, Federal Department of Agriculture approved chelating agent such as citric acid is desirable with preservatives in order to obviate any chelation phenomenon arising from the addition of a preservative agent, the tetracyclines and in general other preservatives. This is particularly true with the complex antibiotics which contain structural atoms capable of giving rise to chelation. The polypeptide antibiotics (the polymixins, subtilin, tyrocidin, circulin; bacitracin and gramicidins) all would be capable of chelation and are structurally different from the tetracyclines.

Table 1 shows the result of tests using citric acid as a chelating agent. It is evident from the data of Table 1 that citric acid alone does not provide for preservation. Both the control (Can No. 1) and the fish mixed with citric acid (Can No. 2) gave indications of lack of preservation by the foul odor in less than 18 hours. The addition of as little as 12.5 parts per million of Aureomycin (based on weight of fish, approximately 120 pounds) provided for preservation in excess of 8 days when citric acid was added. Earlier runs with Terramycin, another of the tetracycline antibiotics, similar to Aureomycin, failed to provide for preservation when citric acid was not added. Also, as shown by Table 1, 50 p.p.m. Terramycin was effective in preservation in the presence of citric acid; lower levels of Terramycin were not run in this test.

The processing procedure in obtaining the data of Table 1 was as follows:

(1) Fresh fish taken from the shrimp trawl of a shrimping vessel were used.
(2) The fresh fish were ground in a Rietz PreBreaker powered by the fishing vessel engine.
(3) Fifteen gallons of ground fish (approximately 120 pounds) and 3 gallons of sea water were used in each can.
(4) Order of addition of ingredients to cans was as follows:
Can No. 1—Ground fish added to water and mixed.
Can No. 2—Ground fish added to water containing citric acid and mixed.

Cans 3 to 6—Aureomycin was added to water containing citric acid. Ground fish was added to citric acid solution and mixed.

Cans 7 to 10—Aureomycin was added to whole fish and ground. This mixture was then added to water containing the citric acid and mixed.

Can No. 12—Terramycin used instead of Aureomycin as per procedure for Cans 3 to 6.

(5) All containers received 0.5% of the enzyme Rhozyme B-6 (80% activity) after the above addition and components well mixed.

TABLE 1.—PRESERVATION IN THE PRESENCE OF CITRIC ACID

| Can No. | Citric Acid, grams | Preservative | | Observations |
| | | Aureomycin HCl | Terramycin | |
| | | bacterial activity | | |
| --- | --- | --- | --- | --- |
| 1 | 0 | 0 | 0 | Foul odor in less than 18 hrs. |
| 2 | 110 | 0 | 0 | Do. |
| 3 | 110 | 100 | 0 | |
| 4 | 110 | 50 | 0 | Contents of cans 3 to 6 gave no evidence of foul odor in 8 days. |
| 5 | 110 | 25 | 0 | |
| 6 | 110 | 12.5 | 0 | |
| 7 | 110 | 100 | 0 | |
| 8 | 110 | 50 | 0 | Contents of cans 7 to 10 gave no evidence of foul odor in 8 days. |
| 9 | 110 | 25 | 0 | |
| 10 | 110 | 12.5 | 0 | |
| 12 | 110 | 0 | 50 | Contents of can 12 gave no evidence of foul odor in 8 days. |

The following example describes the invention as related to a shrimp boat operation:

The catch, representing a mixture of shrimp and fish, is emptied from the trawl onto the deck of the boat. Shrimp are sorted from fish, deheaded and iced in the hold of the boat. Fish and shrimp heads are fed into a grinder. Ground fish are discharged into a water tight, air vented tank in the hold of the boat. Water equal to 10 percent of the weight of the fish containing 10–400 p.p.m. bacterial activity Soluble Terramycin and 180–720 p.p.m. bacterial activity of nf. 180 (p.p.m. based on fish weight) along with citric acid at the rate of 1 gram per pound of fish (0.2% by weight based on weight of fish, or 0.1% to 4.0%) is added or was present in the tank before ground fish was added. This procedure is repeated with each trawl catch. In practice water may be charged into the tank before putting to sea. The charge of water is determined by anticipated catch of trash fish, 10 tons, 20 tons, etc. In this situation only preservative, chelating agent and enzyme are added as sea operations. Under these conditions the boat can be at sea for a period of eight days.

The boat returns from sea and ties to the dock of the land-based operations. Here the liquid digest and undigested portions of the fish are pumped into holding tanks on land. Boat tanks are rinsed with small volumes of water and the rinse solution also pumped to land holding tanks. Finally, the storage tanks on the boat are sterilized by steam and/or disinfectants. This eliminates the possibility of development of a strain of bacteria resistant to the preservatives used in the process.

Land-based operations involve further digestion at 45 to 50° C., or at higher temperatures such as 70° C., decantation, dewatering of solids by shaker screens, centrifugation, concentration of liquid digest in an evaporator, drying of fish bones and scales for grinding to a meal, drying of undigested fish (sludge from the centrifuge) for grinding to a meal, and oil recovery. Products produced are fish solubles (32% protein), bones and scales meal (approx. 30% protein), fish meal (approximately 60% protein), and fish oil, based on one ton of rough or trash fish caught in shrimper's trawl (Texas area), approximately 740 pounds of fish solubles, 137 pounds of bones and scales meal, 58 pounds of fish meal, and 79 pounds of fish oil are derived as products from the preservative-enzyme fish handling process. These yields are from fish assaying 16% protein, 73.5 moisture and 4.5 percent oil.

The foregoing example is given for shrimp boat collection and land-based processing operations. This does not preclude other types of fish boats or fish collecting boats or vessels. Nor does it preclude processing operations (solubles, meal, oil production) aboard factory vessels at sea.

The superior food product obtainable by the process of this invention results directly from the fact that the fish are disintegrated as they are caught on the fishing vessel and the fact that the treatment process is commenced at once and occupies the time normally required for transportation of the fish to shore or for the catching of more fish. Thus the fish are disintegrated and treated in the nascent state and reduced to an agglomerate which may be pumped through a pipeline to the land-based holding tanks from which the agglomerate is treated for deriving the fish products as heretofore explained. No such superior results would be obtained using existing knowledge where the fish are transported to shore and thereafter subjected to treatment.

As employed herein with respect to preservatives, the term "non-toxic" means a preservative which is not harmful to a toxic extent to the creature, human or non-human, consuming the food product or feed in which the fish products of this invention are incorporated based on the quantities of the preservatives so consumed.

While the process of this invention has been described in certain of its preferred embodiments it is realized that modifications may be made, and it is to be understood that no limitations upon the invention are intended other than those which may be imposed by the scope of the appended claims.

What we claim and desire to secure by Letters Patent is:

1. The method of processing at ambient temperatures freshly caught fish into essentially fish bones and fish scales, wet fish meal, fish solubles and fish oil including comminuting freshly caught whole fish into pieces of the order of magnitude of one inch cubes; introducing the comminuted fish without delay into a digestion vessel; introducing into the vessel alkaline earth metal cation-containing water; adding in addition to any enzyme which may be present in the fish a proteolytic enzyme in proteolytic proportions, said proteolytic enzyme being characterized by retaining substantially its full proteolytic function in the absence of calcium and magnesium ions; adding a non-toxic antibiotic preservative in quantities sufficient to inhibit bacteriological activity of an extent deleterious to the final utilization of the fish products; adding a chelating agent for calcium and magnesium ions to protect the preservative; all the foregoing being combined without delay; and the water being added in at least sufficient quantity to render the whole a mobile homogenous slurry; and retaining the aforesaid components in the vessel until the fish pieces have been accordingly resolved into the aforesaid constituents.

2. The method as set forth in claim 1 wherein the enzyme is introduced in quantities of 0.1% to 4.0% of the weight of fish and water.

3. The method as set forth in claim 1 wherein the preservative is added in bacterially active quantities of 10 to 400 parts per million by weight based on the weight of the fresh fish.

4. The method as set forth in claim 1 wherein the chelating agent is citric acid.

5. The method as set forth in claim 1 wherein the preservative is selected from the group consisting of penicillin, oxytetracycline, chlorotetracycline, furazolidone, and water soluble and water dispersible organic and inorganic salts thereof.

6. The method as set forth in claim 1 wherein the chelating agent is citric acid and is present in a quantity of 0.1% to 4.0% by weight based on the weight of the fresh fish.

References Cited by the Examiner

UNITED STATES PATENTS

| | | | |
|---|---|---|---|
| 1,642,209 | 9/1927 | Kahn | 99—18 |
| 2,806,790 | 9/1957 | Bedford | 99—18 |
| 2,944,907 | 7/1960 | Pagano et al. | 99—158 |
| 2,997,471 | 8/1961 | Cheney et al. | 99—158 |
| 3,041,174 | 6/1962 | Ehlert | 99—18 |
| 3,170,794 | 2/1965 | Jeffreys et al. | 99—18 |

OTHER REFERENCES

Jarvis, "Packing Crab Meat in Japan," January 1940, p. 3, Memo S–349, Dept. of Interior, Bureau of Fisheries, Washington, D.C.

Martell et al., Chemistry of the Metal Chelate Compounds, pp. 424–5, Prentice Hall, Inc., Englewood Clifts, N.J., 1956.

Tressler et al., Marine Products of Commerce, pp. 691–695, Reinhold Publishing Corp., New York, N.Y., 1951.

A. LOUIS MONACELL, *Primary Examiner.*